Jan. 31, 1956   J. E. SHERBORNE ET AL   2,733,005
POTENTIOMETRIC OIL RESERVOIR MODEL
Filed March 16, 1951   2 Sheets-Sheet 1

INVENTORS.
JOHN E. SHERBORNE,
EARLE R. ATKINS JR.,
By Ross J. Garofalo
ATTORNEY.

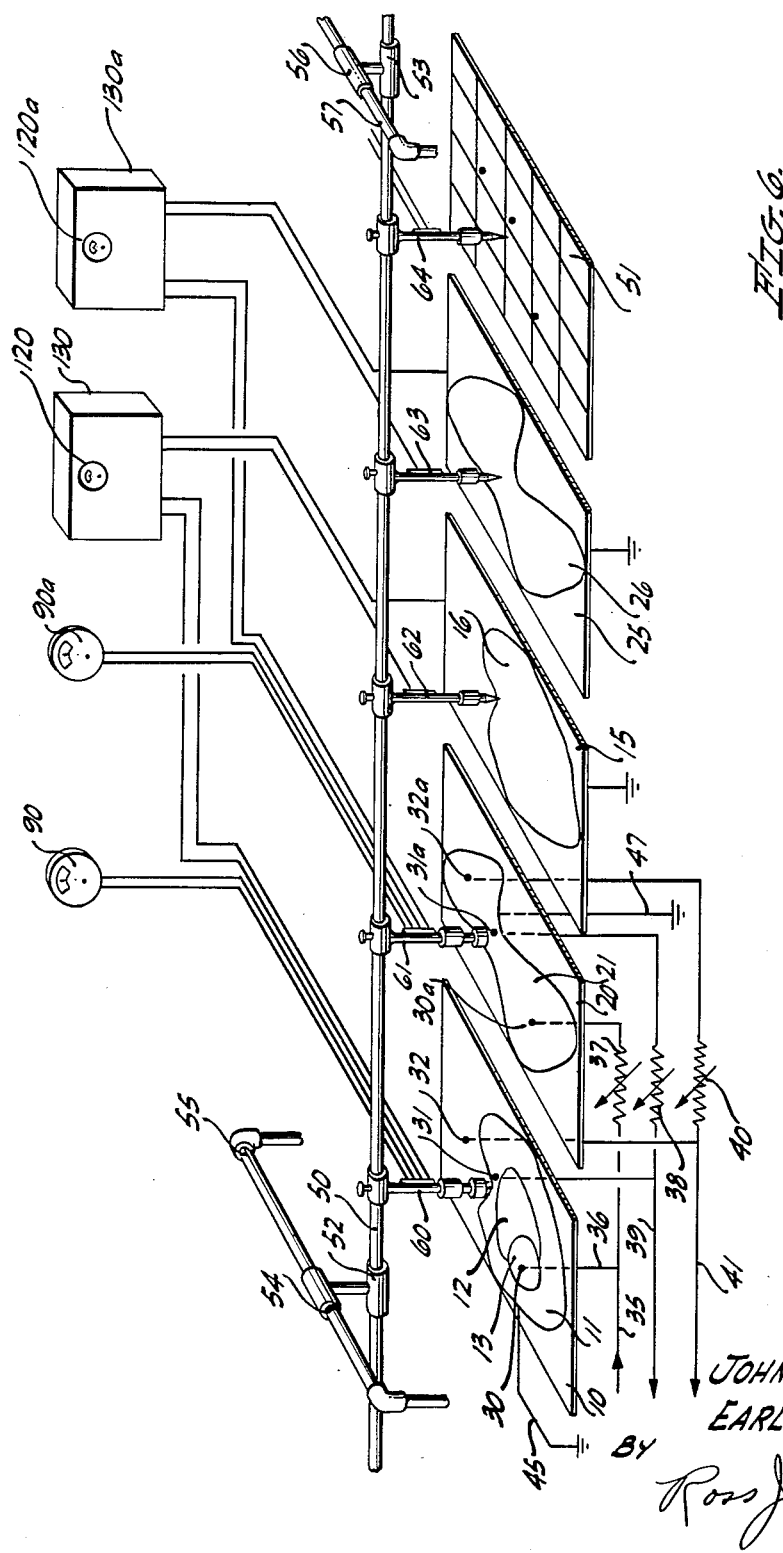

ent Office
2,733,005
Patented Jan. 31, 1956

2,733,005

POTENTIOMETRIC OIL RESERVOIR MODEL

John E. Sherborne, Whittier, and Earle R. Atkins, Jr., Anaheim, Calif., assignors to Union Oil Company of California, Los Angeles, Calif., a corporation of California Application March 16, 1951, Serial No. 215,986

16 Claims. (Cl. 235—61)

This invention relates generally to the construction of electrical models to simulate the physical behavior of oil-bearing reservoirs and to methods for using such models. More particularly, this invention relates to the construction and to the use of electrical models for the simulation and study of oil-bearing reservoirs undergoing either primary or secondary recovery, e. g., cycling, gas drive, water flooding and the like.

The physical analogy existing between fluid flow through a permeable membrane and electrical current flow through an electrical conductor has been described in "Flow in Homogeneous Fluids" by M. Muskat. In comparing fluid flow to electrical flow, the hydrodynamic pressure gradient corresponds to the voltage or potential gradient while the ratio of permeability to viscosity corresponds to specific conductivity. This principle has been widely used through the petroleum industry to study oil, gas and water flow through oil and gas-bearing formations.

For preparing electrical models of the oil-bearing reservoir the common approach in the past has been to assume formations of uniform thickness and permeability whereby a planar model of uniform conductivity is required and such can be easily constructed. In handling more complicated reservoirs an average permeability is assumed and variations of formation thickness are represented by varying the depth and shape of an electrolytic bath. It is also customary to neglect variations of porosity throughout the physical analogue of the electrical model and to assume that such porosity is constant throughout the physical area represented.

During the actual flooding of an oil reservoir with water or during gas drives of such reservoirs the flooding or driving agent normally pursues avenues of minimum resistance and flows very rapidly through highly permeable portions of the zone and relatively slowly through less permeable portions. Previous electrical models, wherein an average permeability has been tacitly assumed for the entire reservoir, or for a section of the reservoir, have made no allowance for this factor, and data obtained thereby have been of rather limited value.

It is an object of this invention to construct and use an electrical model analogue of oil-bearing formations wherein an interconnected sandwich of sections of an oil-bearing formation is represented by an interconnected sandwich of sections of electrically conductive material wherein the group or series of sections of conductive material is everywhere in electrical contact with continuous sections simulating interflow between sections analogous to the physical state in the oil-bearing formation.

It is another object of this invention to represent a sandwich of dissimilar interconnected sections of an oil-bearing formation by a corresponding sandwich series of electrically conductive material wherein each of the electrical sections is composed of a material having an electrical conductivity which is proportional to the permeability of the actual section represented and the electrical counterparts are in direct areal physical contact to simulate direct areal physical contact of the actual sections in the formation.

It is another object of this invention to prepare an electrical replica of an oil-bearing formation wherein the height of the model is proportional to the height of the formation represented, the conductivity (reciprocal of resistivity) of the conductive material is proportional to the permeability of the formation represented and wherein an element of the projected area is proportional to the corresponding element of the projected area of the formation.

It is another object of this invention to employ a separate model layer to simulate changes in the porosity of the formation throughout its areal extent.

It is another object of this invention to electrically inter-relate the electrical variations obtained from a porosity model with the electrical variations of a permeability model whereupon a combined effect of the relationship between permeability and porosity may be obtained.

It is an object of this invention to construct and use an electrical model analogue of oil-bearing formations wherein the effect of varying flow through strata of varying permeability within the formation is represented.

It is another object of this invention to represent an oil-bearing reservoir comprising numerous strata, separable into a series of distinct permeability classes, by means of an electrical model comprising a series of separate layers, wherein each group of strata of a given permeability class is represented by one of the series of layers.

It is another object of this invention to provide a model layer whose electrical conductivity is varied throughout a vertical section in proportion to the average permeability of a corresponding section or sections of earth strata being represented and to the vertical depth of said section or sections.

It is another object of this invention to employ an integrated series of model layers to simulate an oil-bearing formation wherein each layer represents a grouping of all strata of a given permeability class within a vertical projection section of the formation.

It is another object of this invention to prepare solid model layers for representing oil-bearing formations.

It is another object of this invention to prepare model layers by imprinting or superimposing a dispersion of an electrically conductive material upon a relatively non-conductive material.

Other objects and advantages of this invention will become apparent to those skilled in the art as the description thereof proceeds.

Briefly, this invention relates to the construction and use of multi-layered electrical models for simulating various conditions and flows within an oil-bearing reservoir such as those conditions and flows which occur during secondary recovery operations. In preparing a model, oil field samples of earth and rock are taken during the history of the oil field or samples taken from test well bores give physical data such as permeability, porosity and the like from which the character of the oil field is determined. In other cases where extensive data is lacking or is meager, estimated or calculated data may be employed in the construction of the model. In constructing model layers of this invention a single isolated oil-bearing reservoir is represented by a single composite model layer. Where physically disconnected oil reservoirs have been artificially connected through well bores and the like or are interconnected through a relatively small section or channel, each of the reservoirs is represented by a separate layer with suitable electrical connection being employed therebetween to simulate the physical connection.

In the preparation of a composite model layer for a single oil reservoir it generally happens that the permeability of the reservoir varies considerably in each of the three component directions. Furthermore, an attempt to separate the reservoir into a series of slabs, regardless of the method of slicing, does not adequately represent the true state of affairs since such slicing neglects to account for the interfacial fluid exchange between the two slabs. Thus oil flowing through a formation of low permeability tends to migrate toward a section of high permeability and thereafter to flow in the highly permeable section or slab.

In the preparation of the composite model layer according to this invention the formation is divided up into a series of three dimensional bodies which corresponds in physical shape and distribution to the actual permeability sections represented. In constructing the model an electrically conductive material is shaped so that its area and height are proportional respectively to the area and height of the section of the reservoir represented. The contiguous section of the reservoir is then fitted to the first section and it likewise is fashioned of a material whose conductivity is proportional to its permeability. After construction of the entire series of permeability classes the composite model layer will have been prepared.

A particularly useful method for preparing such composite model layers consists in preparing resistive inks or other such material wherein the conductivity of a unit volume of material is proportional to the permeability of a unit volume of the formation to be represented. The lowermost formation permeability layer equivalent section is then applied to a suitable non-conductive base so that its height corresponds to the height of the formation represented and its area corresponds to the area of the formation represented. Following the deposition or construction of the lowermost layer the next permeability class is deposited or constructed immediately over and in direct contact with the first permeability class from material having a conductivity corresponding to its permeability. The second layer is deposited so that its physical relationship to the first layer corresponds to the actual relationship between the layers represented. After the entire series of layers and the whole of the reservoir has been assembled by spraying, painting or otherwise, the entire assembly will correspond areally and volumetrically to the actual formation reservoir.

Another feature in this invention resides in the use of a separate porosity model to correct and make changes for the porosity of the formation throughout its physical extent. For making such corrections an electrically conductive material is deposited upon a base consisting of a highly conductive material and a suitable probe coordinating apparatus is employed to align the probe on the permeability model with a probe on the porosity model such that the corresponding physical area represented is contacted. Throughout the porosity model there is a varying resistance set up between the probe on the top of the model and the highly electrically conductive material forming the supporting base. This resistance is so changed during the laying down of this layer, throughout the areal extent of the formation so as to correspond to the changes in porosity throughout the areal extent of the formation.

In employing the combined permeability and porosity models as a single unit, electrical currents are impressed or withdrawn from the permeability model at the various corresponding injection or production wells to correspond to fluid flow and an incremental voltage $\Delta V$ is measured on the permeability model between two points in the potential field. Simultaneously, the probe on the porosity model picks off a resistance which corresponds to the porosity of the formation between the two particular points. The incremental voltage $\Delta V$ and the resistance from the porosity model are then electrically inter-related to obtain an electrical quantity, such as current which is proportional to the fluid transit time gradient at the particular point.

Figure 6 shows a general layout of the equipment for carrying out the invention and shows two permeability model layers each representing distinctive oil reservoirs, the oil reservoirs being inter-connected by oil wells and also a porosity model for each of the permeability models.

Perhaps the method and application of this invention can best be understood by reference to the drawings.

Figure 1:
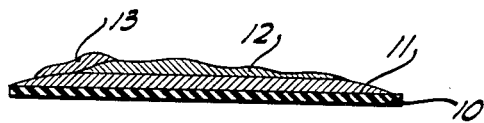
Figure 1 shows a cross sectional view of a model with composite layers representing volume and permeability changes of a particular oil reservoir.

Referring now more particularly to attached Figure 1, the base 10 or supporting material for the permeability model layer is substantially an electrical insulator relative to the conductive material which it supports. The lowermost section of the reservoir to be represented has an average permeability $K_1$ while two other sections of the reservoir have average permeabilities $K_2$ and $K_3$, respectively. A series of three conductive materials such as paints, inks or the like are prepared for depositing such materials so that the following relationships exist between their resistivity and the permeability of the formation which it is to represent.

$$\frac{1}{R_1}=CK_1$$

$$\frac{1}{R_2}=CK_2$$

$$\frac{1}{R_3}=CK_3$$

It is noted that the reciprocal of resistivity is conductivity. In the next step in the preparation of the model, a layer of the first conductive material having a specific resistivity $R_1$ is laid down on base 10 to form layer 11. Layer 11 is so related to the section of formation which it represents that its incremental area is proportional to the incremental area of the section of the reservoir represented and its height $h_m$ is everywhere proportional to the height of the section of the reservoir $h_f$. Thus the following relationships exist between the length $e$, width $w$ and height $h$ of layer 11 and the section of the reservoir represented.

$$l_m = b_1 l_f$$
$$w_m = b_2 w_f$$
$$h_m = b_3 h_f$$

In the preferred modification $b_1 = b_2 = b_3$. In general it has been found that a suitable model is obtained if only $b_1 = b_2$. However, in certain cases the constants may be so chosen that $$b_1 \neq b_2 \neq b_3$$

After the deposition of layer 11, such as by spraying a resistive ink or paint on base 10 over a corresponding area and in corresponding depth, layer 12 is deposited over layer 11 in a physical relationship which corresponds to the physical relationship existing between the actual sections of the formation represented. Likewise, the material for layer 12 is so prepared that the inverse of its specific resistivity $R_2$ is equal to a constant C times the permeability $K_2$ of the section of the reservoir which it represents. The length, width and thickness of layer 12 are related to the actual formation which it represents by the same constants $b_1$, $b_2$, and $b_3$ which relate the length, width and thickness of layer 11 to the section of the reservoir which it represents.

Layer 13 is suitably prepared in substantially the same manner and relationship to layers 11 and 12 as has been described hereinbefore in connection with the relationship between layers 11 and 12 themselves.

Figure 2:
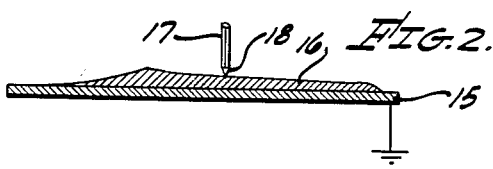
Figure 2 shows a cross sectional view of a porosity model which represents changes in porosity throughout the oil reservoir. The porosity model might also be represented by a mosaic of varied conductivity material or materials laid down to a common thickness.

Referring now more particularly to Figure 2 for the construction of a porosity model layer, base 15 is relatively a highly conductive solid supporting material such as a metallic plate. Resistive material 16 is deposited on the surface of base 15 by substantially the same physical steps as in the preparation of the preceding permeability model layer. However, the resistivity of layer 16 is such that the resistance between base 15 and a probe 17 touching point 18 on the surface of layer 16 varies in accordance with the changes in the porosity of the reservoir. Body 10 mounting permeability layers and body 15 mounting porosity layers correspond throughout their areal extent.

In one modification the porosity model layer may be prepared in the form of a mosiac employing different materials of construction for each piece to give the proper resistances. In another form the porsity model layer may be of cell type formed by a honeycomb on its side wherein each cell is filled with a suitable resistance material and surrounded by an insulating material.

The basic equation for relating permeability, porosity and incremental voltage $\Delta V$ of a model layer to the transit time within the formation is given by $$T = \frac{M S_m^2 F}{K \Delta V}$$

wherein $T=$ incremental transit time for transporting oil or other fluid.

$M=$ a scale factor for the model.

$S_m=$ the distance on the model over which the incremental voltage is measured.

$F=$ the porosity of the formation at the point of measurement.

$K=$ the effective permeability.

$\Delta V=$ the incremental voltage measured in a direction normal to an equipotential line.

From the foregoing equation where it is assumed that $S_m$ is maintained constant throughout the measurements in a given model T becomes proportional to the expression, $$\frac{F}{K \Delta V}$$

Referring now more particularly to attached Figure 6 a plurality of reservoir models may be employed and studied simultaneously to represent a plurality of actual reservoirs inter-connected by actual oil wells. In Figure 6 a permeability model layer on base 10 consists of three reservoir section layers 11, 12 and 13, respectively, as was shown in Figure 1. Porosity model layer on base 15 mounting layer 16 is the same as was shown in Figure 2. A second permeability composite model is mounted on base 20 and because of its uniformity carries a single conductive map 21 which corresponds in height throughout its area to the height of the reservoir which it represents. Permeability model layer on base 20 has a corresponding porosity model layer mounted on base 25 which supports the porosity profile simulating material 26. The oil reservoir represented by the composite layers on base 10 and on base 20 have been penetrated by three vertical oil wells 30, 31 and 32 on base 10 and by 30a, 31a and 32a on base 20.

Electrical current is supplied to the permeability model layers through conductor 35 and conductor 36 to electrical contact 30 imbedded in the several model layers. Conductor 35 is also connected through variable resistance 37 to conductor 30a imbedded in the model layer on base 20. The well represented by contacts 30 and 30a is an injection well, for example; the current flow through conductor 35 therefore corresponds, and is proportional to, the injection rate of the injection well. Variable resistance 37 is adjusted to compensate for the differences in pressure at point 30 and point 30a due to the hydrostatic pressure head differences existing in the well by virtue of the fact that the two formations are at different levels.

Injection fluid flows from the well represented by points 30 and 30a through the corresponding reservoirs driving oil away from the injection well and toward the production wells. Oil is removed from points 31 and 31a representing the first production well. Correspondingly, electrical current is withdrawn from point 31 on permeability model 10 and point 31a on permeability model 20 in an amount which is proportional to the relative oil production therefrom. Current withdrawn from point 31a flows through variable resistor 38 representing the hydrostatic head in the well bore between the two formations and joins the current flow in conductor 39 from point 31. Likewise, current is withdrawn from point 32a in proportion and corresponding to the oil product therefrom and passes through variable resistance 40 whence it joins the current flowing in conductor 41. In a particular case no current will pass through point 32 on base 10 which is outside the oil reservoir and therefore is unattached to the layer corresponding to the permeability sections of the reservoir. Variable resistances 38 and 40 correspond to the difference in pressure head in the two production strata.

The periphery of model layer 11 on base 10 is bounded by an electrical conductor which is in turn grounded through conductor 45. Similarly the outer periphery of the model layer 21 on base 20 is also connected to the ground through conductor 47.

In Figure 6 a main suspension rod 50 passes over the two permeability model layers, the two porosity model layers and map layer 51. Rod 50 is supported by journals 52 and 53 at either end respectively, which permit lateral shifting of rod 50. Journal 52 is attached to transverse journal 54 which is suspended on transverse rod 55 and journal 53 is attached to transverse journal 56 which is suspended on transverse rod 57. Transverse rods 55 and 57, respectively are suitably anchored such as to the floor, wall, etc. The arrangement is such that a given point on suspension rod 50 may be moved in any direction across and over the face of the model layer or map lying therebelow. A series of probes 60, 61, 62, 63 and 64 respectively are suspended from suspension rod 50 and extend downwardly and contact the surfaces of the model layers and the map layer respectively. The relative spacing of the probes along suspension rod 50 corresponds to the relative displacement of the several model layers and map so that a point on each of the five probes is aligned with a corresponding geographic point of the model layers or maps.

Figure 4:
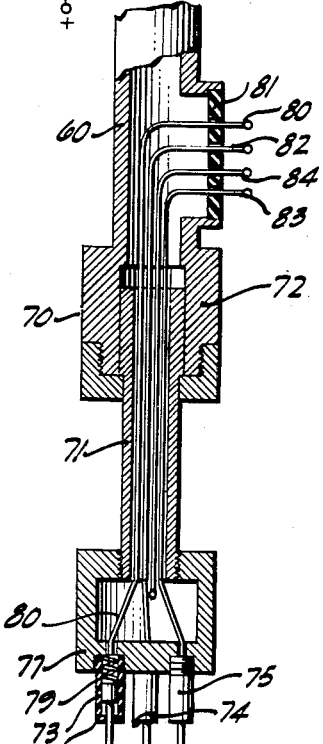
Figure 4 shows a cross-sectional view of a permeability probe.

Probes 60 and 61 contacting permeability model layers on base 10 and base 20 are of the four point variety as shown in detail in cross section in Figure 4.

Referring now more particularly to Figure 4, probe 60 for example, contains a swivel joint 70 which permits rotation of the section of the probe below swivel joint 70 relative to the section above swivel joint 70 while maintaining the two sections in coaxial alignment. Swivel joint 70 is also adapted for upward movement of lower tube 71 relative to the upper section 72. The normal weight of the lower section 71 causes the swivel joint to be normally extended but when necessary the probe may be raised by the contraction of the swivel joint 70. At its lower end probe 60 mounts four individual contacts only three of which are shown in the cross-sectional view, namely 73, 74 and 75. The contacts comprise an outer tubular section 76 threadable into a supporting member 77. A tubular extensible electrically conductive contact 78 passes freely within tubular member 76 and is pressed downward by spring 79. The probe is required to contact surfaces of varying elevation electrically. Contacting element 78 is normally pushed downwardly by spring 79 but is partially retractable within tubular member 76 as the contour of the surface being contacted changes. Contacting element 78 is electrically connected through spring 79 to conductor 80 which passes upwardly through the swivel joint and emerges from the probe through insulated plate 81. In like manner contacting elements 74 and 75 are connected electrically to conductors 82 and 83 respectively while the fourth contacting element having been cut away is connected to conductor 84.

Referring again more particularly to Figure 6, probes 62 and 63 respectively are similar in construction to the four point probes described in connection with Figure 4 with the exception that only a single contacting element is required. Since only a single point of contact is required, the swivel joint is not necessary to permit rotation about the single point, but the same or a similar type of joint is required to permit changes in the elevation of the contacting element as the surface elevation of the porosity profile model changes.

The elements of probe 64 will vary with the type of operation employed and will be described more particularly hereinafter. In the simplest modification, probe 64 simply consists of a pointer aligned with map 51 to indicate the geographic location of the remaining four pointers at the time of measurement.

Figure 5:
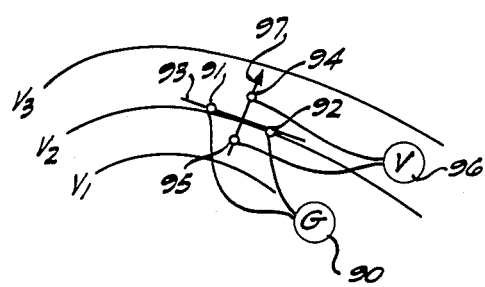
Figure 5 shows the relationship of the permeability probe to equipotential layers on the permeability model at the time that a reading is made.

Referring now more particularly to Figure 5 which shows the method of employing the four point probe described in Figure 1, a series of isopotential lines exist throughout the surface of permeability model layer on base 10 for example, in Figure 6. In Figure 5 three such isopotential lines are represented by lines $V_1$, $V_2$ and $V_3$. Since isopotential lines on the electrical model correspond to isobaric lines in the physical analog, it is apparent that the direction of movement of an incremental volume of fluid is generally normal to isopotential lines at all points. Accordingly the direction of fluid flow can be plotted along a family of curves which are orthogonal to the family of isopotential curves.

In the use of the four point probe the probe is rotated until galvanometer 90 attached to probe contacts 91 and 92, respectively, gives a null reading. Under these conditions a line 93 drawn through probe contacts 91 and 92 is tangent to a given isopotential line, for example, line $V_2$. Probe contacts 94 and 95, respectively, are attached to suitable mechanism for recording incremental voltage $\Delta V$, such mechanism being indicated diagrammatically at 96. When probe contacts 91 and 92 are aligned so that a null reading is obtained on galvanometer 90, line 93 is then tangent to an isopotential curve and line 97 through probes 94 and 95, respectively, is therefore normal to the isopotential line. Since the distance between probes 94 and 95 is maintained constant, it is apparent that the incremental voltage $\Delta V$ observed by mechanism 96 is an incremental voltage per unit distance along a line which is normal to the isopotential curve in the proximity thereof. Expressed another way, probes 94 and 95, respectively, measure the voltage gradient per unit distance in the direction of maximum change per unit distance.

Figure 3:
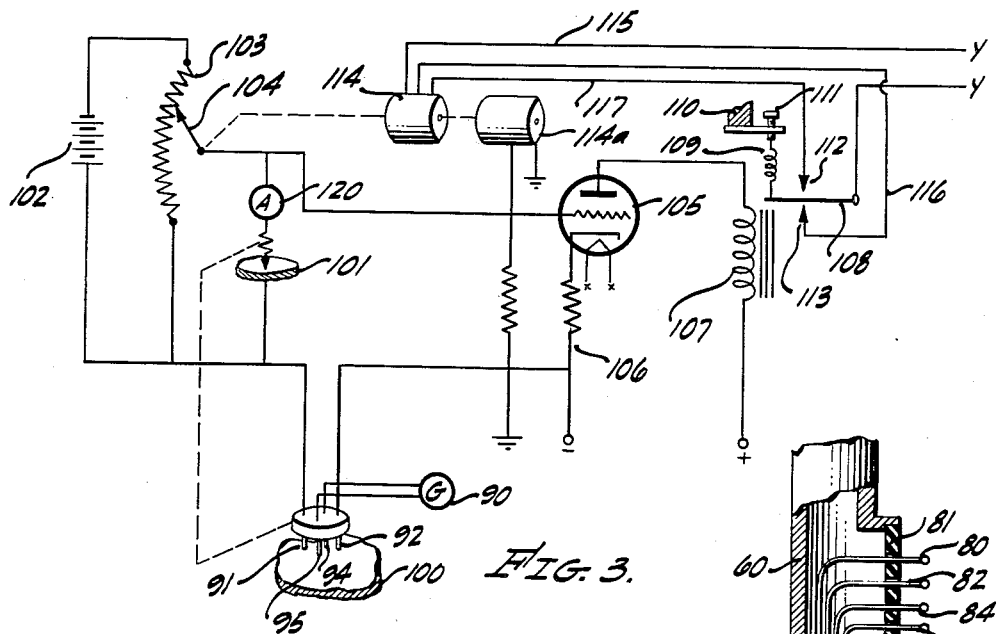
Figure 3 shows any electrical circuit for interconnecting the incremental voltage $\Delta V$ from the permeability voltage with the resistance taken from the porosity probe, thus providing a simple computing machine for the determination of time of flow over the incremental distance.

Referring now more particularly to Figure 3, in the preferred modification of the invention, the incremental voltage is supplied to a suitable electrical mechanism for inter-relating the permeability with the porosity models. In Figure 3 model layer 100 represents a small section of a permeability model layer and model layer 101 represents a small section of the porosity model layer. The four point probe in contact with model layer section 100 carries the same numerical designation as shown in Figure 5.

Electrical source 102 establishes a voltage gradient across the outer terminals of potentiometer 103. Motor driven sliding contact 104 of potentiometer 103 picks off various voltages from the potentiometer in accordance with its position determined by its motor driven mechanism 114.

Anti-hunt mechanism 114a is attached to a servo-motor 114 to prevent excessive hunting and slow repositioning. Such devices are well known in the art of servo-motors and will therefore not be described in detail. The incremental voltage picked off the potentiometer by pointer 104 is of such magnitude and direction as to exactly balance and oppose incremental voltage $\Delta V$ established between probe contacts 91 and 92, respectively. Under such conditions there is a zero contribution resulting from the sum of the incremental voltage plus the potentiometric voltage to the grid bias of vacuum tube 105. The grid bias of tube 105 is therefore determined by the self-biasing character of resistor 106. Filaments of tube 105 are connected to a suitable voltage source through leads X—X. Under varying conditions of grid bias, current flows from the cathode to the plate of tube 105 and thence through the relay coil 107. Relay coil 107 is equipped with an electromagnetically deflectible bar 108 which is adjustable by means of spring 109 which is anchored to support 110. The tension of spring 109 is adjusted by adjustment screw 111 so that when the picked off potentiometric voltage exactly balances and opposes the incremental voltage from the probe, the current flowing from cathode to plate in tube 105 and through the relay coil 107 is such that deflectible bar 108 is maintained in a position of zero motor movement.

Deflectible bar 108 is fitted with oppositely positioned contacts 112 and 113 respectively which are contacted with bar 108 when the latter is in a deflected position. Reversible control motor 114 operates and controls the position of potentiometric slide contact 104. Voltage Y—Y is employed to actuate motor 114. Lead 115 passes directly to one terminal of Y—Y while the other terminal of Y—Y connects to deflectible bar 108. Generally speaking when the grid bias of tube 105 is low there is an increased current flow through relay coil 107 which causes the attraction of deflectible bar 108 and presses the latter into contact with contact 113 which supplies electrical current from Y—Y through lead 116 to motor 114 which repositions pointer 104 to increase the grid bias of tube 105. Correspondingly when the bias of tube 105 is high there is a decrease in the current flow through 107 which permits spring 109 to pull bar 108 and to contact with contact 112 thereby passing current from Y—Y through lead 117 causing motor 114 to reset pointer 104 to increase the grid bias of tube 105. From the foregoing it is apparent that by a suitable setting of the tension in spring 109 by screw 111 pointer 104 can be employed to obtain a voltage equal to and opposed to the incremental voltage existing across probe contacts 91 and 92, respectively.

The voltage obtained from potentiometer 103 by pointer 104 is supplied through ammeter 120 to porosity model layer 101. The resistance of porosity model layer 101 varies directly with the porosity of the formation and the picked off voltage of the potentiometer 103 varies directly with the voltage gradient of the permeability model layer and is proportional to the pressure gradient in the formation. The current flow through ammeter 120 is determined by $$\frac{\Delta V}{R}$$

which is in turn the reciprocal of $\Delta t$ where $\Delta t$ is the transit time. The transit time per unit distance and its direction determines the transit time gradient at or near a particular point.

In certain cases the porosity model may be fashioned so that its resistance varies with the ratio of the porosity to the relative permeability rather than directly with the porosity alone.

While the inter-relation of voltage gradient and resistance has been determined by means of current flow to obtain the transit time gradients, it is apparent that other electrical quantities may be similarly employed to determine the transit time gradient.

In one modification of the invention the ammeter 120 is calibrated to read in reciprocal amps so that the scale reading is therefore directly proportional to the transit time.

Referring again more particularly to Figure 6 a plurality of permeability and of porosity model layers may be employed simultaneously. In the operation of the several model layers, for example, the current flows through the permeability model layers and is established by passing appropriate currents through leads 35, 39 and 41 respectively to simulate fluid flow into or out of such wells. After the several probes are in equivalent alignment with respect to the several model layers the map readings may be taken on any of the permeability model layers. In the use of probe 64, for example, probe 60 is placed in the vicinity of point 30 representing the input well and the two probe contacts attached to galvanometer 90 are rotated by the swivel joint of probe 60 until a null reading is obtained by galvanometer 90. Under these conditions the voltage gradient along the normal to the isopotential line is supplied to analyzer 130 which comprises the electrical apparatus shown in Figure 3, for example. At the same time corresponding probe 62 is suitably positioned over porosity model layer 16 to indicate the porosity of the section of formation which the probe 60 is attempting to analyze. The resistance of the porosity model layer is likewise supplied to analyzer 130. Analyzer 130 inter-relates the incremental voltage ΔV of the permeability model layer with the R of the porosity model layer and produces an answer in the form of amps or preferably reciprocal amps on meter 120. At the same time probe 64 contacting map 51 indicates the geographic position of the several probes. In one modification of the invention probe 64 is adapted to mark the point at which the readings are taken such as by an electrically or magnetically operated stamp or otherwise. In the simplest modification of the invention the amps or reciprocal amps observed on meter 120 are written in on map 51 adjacent to the mark indicated by probe 64.

In determining the next transit time, probe 60 is moved so that the one of the ΔV contacting probes coincides with the former position of the opposite ΔV probe contact and about this point the two galvanometer probe contacts are rotated until a null reading is obtained with galvanometer 90. Thereafter the same sequence of operations is employed to obtain the second point which operations culminate in the observation and rotation on the map of a reading of samples or reciprocal amps. The sequence is repeated until the model has been traversed whereupon a series of cords lying end to end will have ben obtained which approximates a curve orthogonal to the isopotential curves. Furthermore, the transit time along each cord is noted on the map. It is apparent that integration of the transit time along orthogonal curves may be determined. The determination of the orthogonal curves with probe 61 is indicated by galvanometer 90a and by analyzer 130a operating ammeter or reciprocal ammeter 120a.

In the employment of the model to simulate a water flooding operation, alternating or direct current voltages are applied between the electrodes representing input wells and the electrodes representing output wells such that the current flow into each of the input well electrodes and out of each of the output well electrodes is proportional to the injection rates into the respective input wells and out of the respective output wells respectively. A probe is then employed to determine equipotential contours throughout the region of each of the model layers. The determinations of the equipotential contours for each model layer are transferred to separate maps of the reservoir and are thereafter employed to determine transit times for the transport of oil from one point to another point within each of the classes of strata. Such data are employed to predict water break through in any of the output wells and to assist in operating the field to its greatest productivity.

From the transit time data determined for each permeability class the path of the advancing water front in any of the permeability classes of strata can be found. From such data it might be decided that certain highly permeable sections of the formation should be shut off by cementing in order to produce the field most advantageously. Such data might also indicate the desirability of shutting down wells, producing the more highly permeable formations first, or of reassigning production rates among the producing wells to increase the ultimate production.

A number of methods are useful for the actual fabrication of the model layers. In general the model layer comprises a relatively electrically conductive material joined to a relatively non-conductive material wherein the area of the model layer corresponds to the area of the segment of the oil-bearing formation being represented. Electrodes are attached to the electrically conductive material to represent each of the corresponding wells in the segment of the formation.

A suitable electrically conductive material is generally one which has a medium or high specific electrical conductance, such as finely divided carbon, finely divided metallic powders, thin films of metals or carbon or thin films of material impregnated with metal, carbon, or other conductive material, and the like. Suitable electrically non-conductive materials include ceramics, plastics, asbestos, porous porcelain and the like.

The electrically conductive material can be joined to the electrically non-conductive material in a number of ways. In the preferred modification conducting material can be deposited on a non-conducting material by painting or super-imposing the latter with several layers of a dispersion of the former. Thus a model layer can be prepared by imprinting a porcelain surface with several layers of India ink or metal pigment ink. The variation of the number of layers of ink so applied varies the resistance of the finished surface to conform to the desired resistance pattern called for by the formation. In this case the conductivity of a given area is proportional to the thickness, i. e., number of layers, of the imprinted material.

In still another method the model layer is prepared by intimately mixing a melted or unset plastic, such as a melted methacrylate polymer, with a conducting agent such as finely divided carbon, powdered metals and the like whereby a uniform fluid or a moldable mass is obtained. The fluid or mass is then shaped or sculptured into a sheet of varying thickness and allowed to set or harden to a solid. The thickness of the sheet is proportional to the conductivity and is varied throughout to give the desired resistance pattern.

In any of the foregoing methods the electrodes are then attached to the solid model layer to represent the wells, input or output, of the oil-bearing formation and the oil flow distribution of formation is studied as has been described hereinbefore. It is apparent that such model layers may be studied separately or that several may be inter-connected and studied as a unit according to the methods described hereinbefore.

It is apparent that many modifications of the invention may be made by those skilled in the art without departing from the spirit and scope of the following claims.

We claim:

1. A method for evaluating fluid flow in an oil-bearing formation, which method comprises establishing a voltage distribution throughout an electrical model of said oil-bearing formation so that the voltage distribution pattern in said model corresponds to the pressure distribution pattern in said oil-bearing formation, selecting a plurality of resistances, each of said resistances corresponding geographically to a particular voltage gradient of said model layer, each of said resistances being proportional to the porosity of said oil-bearing formation at the geographical location corresponding thereto, and electrically inter-relating a given voltage gradient and corresponding resistance to obtain a current proportional to the transit time gradient.

2. A method for evaluating fluid flow in an oil-bearing formation, which method comprises passing electrical currents through a series of electrodes on a permeability model resistance layer, said permeability model resistance layer corresponding to an oil-bearing formation and each of said electrodes corresponding to wells in said oil-bearing formation, controlling said electrical currents so as to represent the fluid flow through each of said wells, thereby establishing a steady static voltage distribution pattern in said model layer corresponding to the pressure distribution pattern in said oil-bearing formation, selecting a plurality of resistances wherein each of said resistances corresponds geographically to a particular voltage gradient point of said model layer, each of said resistances being proportional to the porosity of said oil-bearing formation at the geographical point corresponding thereto, and electrically inter-relating a given voltage gradient of said model layer and corresponding resistance to obtain a current proportional to the fluid transit time gradient for the particular geographical area represented by said given voltage gradient and corresponding resistance.

3. A method for evaluating fluid flow in an oil-bearing formation, which method comprises representing the permeability variations of said oil-bearing formation by a plurality of permeability model layers, wherein each of said permeability model layers represents a portion of said oil-bearing formation, the conductivity per unit area of a particular model layer varying with the permeability of the corresponding portion of said oil-bearing formation represented, representing the porosity variations of said oil-bearing formation by a plurality of porosity models, one of said porosity models corresponding to one of said permeability models, wherein the resistance at any point on a particular porosity model varies with the porosity of the corresponding portion of the formation represented, establishing a voltage distribution pattern in each of said permeability model layers corresponding to the pressure distribution pattern in corresponding portions of said oil-bearing formation, electrically inter-relating all of said permeability model layers to correspond to the hydrostatic and hydrodynamic inter-relationship between all of said portions of said oil-bearing formation, and electrically interrelating the voltage gradient at a plurality of points on one of said permeability model layers with geographically corresponding resistances on the corresponding porosity model to obtain a current through said resistances proportional to the fluid transit time gradient at the geographical locations corresponding to said resistances and voltage gradient points.

4. An apparatus for evaluating fluid flow in an oil-bearing formation which comprises a permeability model, said permeability model corresponding in areal extent and thickness to the areal extent and thickness of said oil-bearing formation, the conductivity per unit area of said permeability model varying with the permeability of said oil-bearing formation, a porosity model, said porosity model corresponding in areal extent to said oil-bearing formation, the resistance at any point of said porosity model varying with the porosity of said oil-bearing formation, means for establishing a voltage distribution throughout said permeability model which corresponds to the pressure distribution of said oil-bearing formation, means for determining the voltage gradient at any particular point on said permeability model and means for determining the resistance on said porosity model corresponding to said particular point.

5. An apparatus according to claim 4 which includes a probe coordinating means for translating motion of said means for determining said voltage gradient to said means for determining said resistance of said porosity model.

6. An apparatus according to claim 4 which includes a means for electrically inter-relating said voltage gradient determined from said permeability model and the corresponding resistance determined from said porosity model layer to obtain a current inversely proportional to a transit time gradient.

7. An apparatus according to claim 4 which includes a means for electrically inter-relating said voltage gradient determined from said permeability model and the geographically corresponding resistance determined from said porosity model, said means comprising conducting means for passing a voltage corresponding to said voltage gradient through said corresponding resistance determined by said porosity model to obtain a current inversely proportional to a transit time gradient.

8. An apparatus for evaluating fluid flow in an oil-bearing formation which comprises a plurality of permeability model layers, each of said model layers corresponding to a portion of said oil-bearing formation, the conductivity per unit area of each of said permeability model layers varying with the permeability of that portion of said oil-bearing formation represented, a plurality of porosity model layers, each of said model layers corresponding to a portion of said oil-bearing formation, one of said porosity model layers corresponding to one of said permeability model layers, the resistance of said porosity model layers varying with the porosity of that portion of said oil-bearing formation represented, means for establishing a voltage distribution throughout said permeability model layers which corresponds to the pressure distribution of said oil-bearing formation, means for establishing voltage differences among said plurality of permeability model layers corresponding to pressure differences existing among corresponding portions of said oil-bearing formation, means for determining the voltage gradient between particular neighboring points on one of said permeability model layers and means for determining the resistance of the one of said porosity model layers corresponding at the location corresponding thereon to said particular points.

9. An apparatus according to claim 8 which includes a probe coordinating means for translating motion of said means for determining said voltage gradient on one of said permeability model layers to said means for determining the resistance of the one of said porosity model layers corresponding to said one of said permeability model layers.

10. An apparatus according to claim 8 which includes a means for electrically inter-relating said voltage gradient determined from said permeability model layer and the resistance determined from said porosity model layer to obtain a current proportional to a transit time gradient.

11. An apparatus according to claim 8 which includes a means for electrically inter-relating said voltage gradient determined from said permeability model layer and the resistance determined from said porosity model layer, said means comprising conducting means for passing a voltage corresponding to said voltage gradient through said resistance determined by said porosity model.

12. An electrical model for simulating fluid flows within an oil-bearing formation which comprises a plurality of layers of contiguous electrically conductive solid material, each of said layers representing a corresponding physical section of said oil-bearing formation and corresponding in area and thickness to the area and thickness of said section of oil-bearing formation corresponding, the conductivity of the conductive material in each of said layers differing from that of adjoining layers and being proportional to the permeability of the corresponding section of said formation, each of said layers being electrically and physically inter-connected through coterminous areal contact with its contiguous layers to thereby correspond to the spatial interrelationship existing between the corresponding sections of said oil-bearing formation.

13. In a method for evaluating fluid flow in an oil-bearing formation by measuring voltage gradients in an electric model layer wherein the conducitvity of said model layer is proportional throughout to the permeability of said oil-bearing formation, and wherein the voltage distribution pattern in said model layer corresponds to the pressure distribution pattern in said oil-bearing formation, the improvement which comprises providing a plurality of resistances, each of said resistances being proportional to the porosity of said oil-bearing formation at a given geographical location, and electrically interrelating a particular voltage gradient on said model layer with the one of said resistances corresponding geographically thereto to obtain an electrical quantity which is proportional to the fluid transit time gradient at a given geographical location.

14. A method according to claim 13 wherein said electrical quantity is an electrical current.

15. An apparatus according to claim 12 including in conjunction therewith a porosity model comprising a plurality of areas of varying electrical resistance corresponding to cognate areas of varying porosity in the oil-bearing formation, and means for electrically interrelating the voltage gradient of a point on said permeability model layers with the resistance of a geographically corresponding point of said porosity model whereby a current is obtained through said point of said porosity model which is inversely proportional to the fluid transit time gradient at the corresponding geographic location.

16. In a method for evaluating fluid flow in an oil-bearing formation by measuring voltage gradients in an electric model layer wherein the conductivity of said model layer is proportional throughout to the permeability of said oil-bearing formation, and wherein the voltage distribution pattern in said model layer corresponds to the pressure distribution pattern in said oil-bearing formation, the improvement which comprises providing a plurality of resistances, each of said resistances being proportional to the porosity of said oil-bearing formation at a given geographical location, selecting a particular voltage gradient $V_1$ on said model layer, passing a separate electrical current $I_1$ through the one of said resistances $R_1$ corresponding geographically to $V_1$, controlling the value of $I_1$ through said resistance $R_1$ so that $I_1 R_1$ is equal to $V_1$, thereby maintaining $I_1$ at a value which is inversely proportional to the fluid transit time gradient at the geographical location corresponding to said voltage gradient $V_1$.

References Cited in the file of this patent

UNITED STATES PATENTS

| | | |
|---|---|---|
| 2,423,754 | Bruce | July 8, 1947 |
| 2,547,950 | Lee et al. | Apr. 10, 1951 |
| 2,569,816 | Lee | Oct. 2, 1951 |
| 2,569,817 | Wolf et al. | Oct. 2, 1951 |
| 2,639,090 | Sherborne | May 19, 1953 |

FOREIGN PATENTS

| | | |
|---|---|---|
| 452,573 | Great Britain | Aug. 25, 1936 |

OTHER REFERENCES

Printed Circuit Techniques; National Bureau of Standards Circular 468, November 15, 1947.

Automatic Equipment and Techniques for Field Mapping; J. K. Mickelsen; "General Electric Review," November 1949; pp. 19–23.